H. J. BAKER.
NUT LOCK.
APPLICATION FILED AUG. 24, 1908.

905,273.

Patented Dec. 1, 1908.

Witnesses
C. E. Smith.
S. E. Dodge.

Inventor
H. J. Baker,
By Beeler & Cobb
Attorneys

UNITED STATES PATENT OFFICE.

HENRY J. BAKER, OF CHICAGO, ILLINOIS.

NUT-LOCK.

No. 905,273.     Specification of Letters Patent.     Patented Dec. 1, 1908.

Application filed August 24, 1908. Serial No. 450,006.

*To all whom it may concern:*

Be it known that I, HENRY J. BAKER, a citizen of the United States, residing at Chicago, in the county of Cook and State of Illinois, have invented certain new and useful Improvements in Nut-Locks, of which the following is a specification.

The object of this invention is to provide a novel form of locking device for preventing the displacement of nuts from bolts.

The invention resides primarily in a special form of device employed whereby a nut is adapted to be effectively locked to a bolt, the invention, however, being readily detachable to permit of displacement of the nut at any time should this be desired.

Figure 1:
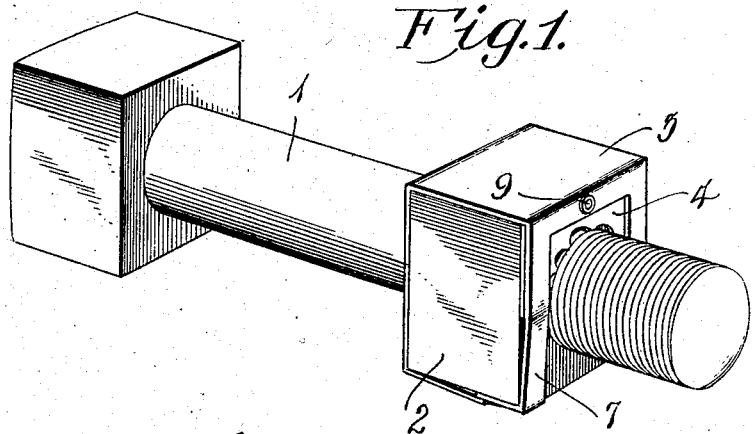
Figure 2:
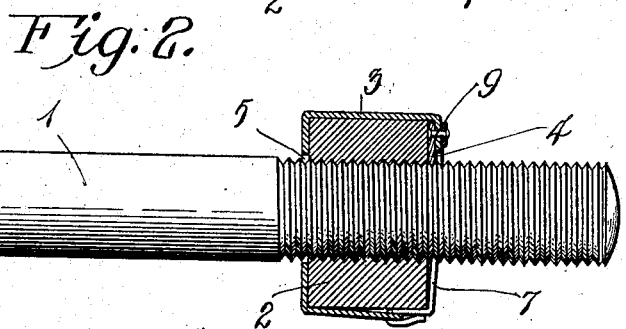
Figure 3:
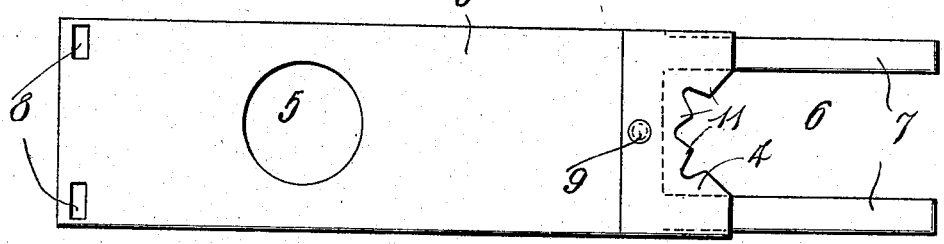
Figure 4:
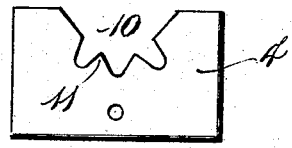

For a full understanding of the invention reference is to be had to the following detail description and to the accompanying drawings, in which Figure 1 is a perspective view of a nut lock embodying the invention applied; Fig. 2 is a vertical sectional view; Fig. 3 is a plan view of a piece of metal from which the clamp member is made, and Fig. 4 is a detail view showing the engaging plate.

Throughout the following detail description, and on the several figures of the drawings, similar parts are referred to by like reference characters.

Referring to the drawings and specifically describing the preferred form of the invention the numeral 1 designates a bolt to which is applied the nut 2, the invention being shown in coöperation with said parts.

The invention comprises primarily two main parts or members, namely, a clamp member 3 and an engaging plate or member 4. The clamp member 3 is preferably made from a piece of sheet metal of any suitable kind, said metal being, however, flexible so that it may be readily bent so as to embrace a nut in the manner shown in Figs. 1 and 2. The clamp member 3 is provided intermediate of its ends with an opening 5 adapted to receive the bolt 1 and one of its ends is bifurcated or slotted, as shown at 6, thereby providing spaced tongues 7. The end of the member 3 opposite that having the tongues 7 is provided with spaced openings 8 through which the tongues 7 may be passed. Proximate to the inner end of the slot 6 the plate from which the member 3 is made is formed with a small opening through which passes a fastening such as a rivet 9 and this fastening secures to the member 3 the engaging plate 4 above referred to.

The engaging plate 4 is preferably made from hard metal and is formed with a recess 10 extending from one of its edges. Teeth 11 are formed along the edge of the recess 10 and said recess is of substantially the same width as the slot 6 of the member 3.

In applying the invention under actual conditions of service the nut 2 will be screwed upon the bolt 1 in the usual manner after the member 3 has been arranged at the inner side of the nut and with the bolt 1 passing through the opening 5. The nut 2 having been screwed hard against the adjacent side of the member 3, the said member 3 is bent so that its ends firmly embrace the nut in the manner shown in Figs. 1 and 2. The bifurcated end of the member 3 receives the outer end of the bolt and the tongues 7 are passed through the openings 8 and thence bent outwardly. The connection of the opposite ends of the member 3 may be effected by any suitable tool and when such connection is tightened in an obvious manner it will be apparent that the teeth 11 of the engaging plate 4 will be caused to engage or embed themselves partially in the threaded portion of the bolt 1. When in engagement with the bolt 1 an end of the plate 4 is engaged by a side of the clamp and said plate is in contact with the outer side of the nut and said plate forms a positive lock preventing unscrewing of the nut in an evident manner. The plate 4 being of hardened metal, preferably steel, may be used again and again, and the same may be said of the member 3 which is made of strap or sheet metal adapted to be bent again and again should this be desirable or necessary in the use thereof.

The invention is comparatively simple in construction and may be cheaply manufactured by reason of the fewness of parts thereof. Furthermore, the invention is easy to apply or remove as conditions warrant.

Having thus described the invention, what is claimed as new, is:

1. In combination with a bolt and a nut screwed thereon, an engaging plate resting against the outer side of the nut and formed with an edge engaging the threaded portion of the bolt, and a clamp consisting of a piece of strap metal provided with an opening receiving a bolt at the inner side of the nut, opposite ends of the clamp being extended outwardly against the sides of the nut and being connected together, a side of the clamp engaging an end of the engaging plate and thereby holding the latter firmly engaged with the threaded portion of the bolt and housed between the nut and clamp, said engaging plate resting flat against and being parallel with the outermost portion of the clamp.

2. The combination with a bolt and a nut screwed thereon, an engaging plate arranged at the outer side of the nut and provided with an engaging edge, and a clamp consisting of a piece of metal having an opening receiving the bolt, one end portion of the clamp being bifurcated to form spaced tongues and its other end having openings to receive said tongues, the ends of the clamp being bent outwardly to engage the sides of the nut and the tongues being passed through the openings aforesaid to secure the ends of the clamp together, and a fastening connecting the engaging plate with the bifurcated end portion of the clamp and said plate being thus held in positive engagement with the bolt at the outer side of the nut.

In testimony whereof I affix my signature in presence of two witnesses.

HENRY J. BAKER.

Witnesses:
 GEORGE CEPHAS BARRETT,
 CHARLES A. HELDER.